US008445403B2

United States Patent
Frantz et al.

(10) Patent No.: US 8,445,403 B2
(45) Date of Patent: May 21, 2013

(54) OXIDATION CATALYST FOR COMMERCIAL VEHICLES COMPRISING A DIESEL MOTOR

(75) Inventors: Stéphanie Frantz, Loerrach (DE); Frank-Walter Schuetze, Haibach (DE); Anke Woerz, Brüssel (BE); Gerald Jeske, Neuberg (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 12/999,031

(22) PCT Filed: Jun. 9, 2009

(86) PCT No.: PCT/EP2009/004117
§ 371 (c)(1),
(2), (4) Date: Jun. 13, 2011

(87) PCT Pub. No.: WO2009/152971
PCT Pub. Date: Dec. 23, 2009

(65) Prior Publication Data
US 2011/0229392 A1    Sep. 22, 2011

(30) Foreign Application Priority Data

Jun. 19, 2008  (EP) ..................... 08011154

(51) Int. Cl.
*B01J 21/00*    (2006.01)
(52) U.S. Cl.
USPC ......................... 502/339; 502/262; 423/213.5
(58) Field of Classification Search
USPC .................... 502/326, 262; 423/213.5
See application file for complete search history.

(56) References Cited

U.S. PATENT DOCUMENTS

| 3,856,707 A | 12/1974 | Kato et al. |
| 4,414,139 A | 11/1983 | Matsuzaka et al. |
| 4,902,487 A | 2/1990 | Cooper et al. |
| 5,157,007 A | 10/1992 | Domesle et al. |
| 5,514,354 A | 5/1996 | Domesle et al. |

(Continued)

FOREIGN PATENT DOCUMENTS

| CN | 1052262 A | 6/1991 |
| DE | 32 38 129 | 5/1983 |

(Continued)

OTHER PUBLICATIONS

PCT Notification of Transmittal of Translation of International Preliminary Report (Form PCT/IB/338) for PCT/EP2009/004117 mailed Jan. 27, 2011(in English language).

(Continued)

*Primary Examiner* — Colleen Dunn
*Assistant Examiner* — Haytham Soliman
(74) *Attorney, Agent, or Firm* — Smith, Gambrell & Russell, LLP

(57) ABSTRACT

An oxidation catalyst is described for the exhaust gas purification of utility vehicles with diesel engines, which contains a substrate and a catalytically active coating of platinum, active aluminum oxide and aluminum-silicon mixed oxide. The two oxidic support materials, aluminum oxide and aluminum-silicon mixed oxide, are catalytically activated with platinum, the majority of platinum being present on the active aluminum oxide. The oxidation catalyst is distinguished by good NO oxidation rates together with a high poisoning resistance against sulfur compounds.

21 Claims, 2 Drawing Sheets

U.S. PATENT DOCUMENTS

| | | | |
|---|---|---|---|
| 5,849,255 | A | 12/1998 | Sawyer et al. |
| 5,928,981 | A | 7/1999 | Leyrer et al. |
| 6,077,489 | A | 6/2000 | Klein et al. |
| 6,165,430 | A * | 12/2000 | Kudla et al. ............... 423/213.5 |
| 6,685,900 | B2 * | 2/2004 | Domesle et al. ........... 423/213.5 |
| 6,843,971 | B2 | 1/2005 | Schäfer-Sindlinger et al. |
| 2002/0028745 | A1 * | 3/2002 | Krylova et al. ............... 502/326 |
| 2002/0039550 | A1 | 4/2002 | Schafer-Sindlinger et al. |
| 2005/0266992 | A1 | 12/2005 | Ohno et al. |
| 2006/0179825 | A1 * | 8/2006 | Hu et al. .......................... 60/297 |
| 2007/0104623 | A1 | 5/2007 | Dettling et al. |

FOREIGN PATENT DOCUMENTS

| | | |
|---|---|---|
| EP | 0 341 832 | 11/1989 |
| EP | 0 432 534 A1 | 6/1991 |
| EP | 0 800 856 | 10/1997 |
| EP | 0 923 981 | 6/1999 |
| EP | 1 129 764 A1 | 9/2001 |
| EP | 1 147 801 | 10/2001 |
| FR | 2 159 328 | 6/1973 |
| WO | 2007/107371 | 9/2007 |

OTHER PUBLICATIONS

PCT International Preliminary Report on Patentability (Form PCT/IB/373) for PCT/EP2009/004117 issued Jan. 18, 2011 (in English language).

PCT Written Opinion of the International Searching Authority (Form/ISA/237) for PCT/EP2009/004117 issued Jan. 18, 2011 (in English language).

International Search Report for PCT/EP2009/004117 mailed Nov. 9, 2009.

* cited by examiner

OXIDATION CATALYST FOR COMMERCIAL VEHICLES COMPRISING A DIESEL MOTOR

The present invention relates to the exhaust gas purification of utility vehicles with diesel engines, and especially an oxidation catalyst which is particularly well-suited to this field of application.

Diesel oxidation catalysts, in particular Pt/alumina-based oxidation catalysts, are well known in the prior art. They are used in order to oxidize the noxious gases carbon monoxide CO and hydrocarbons CH contained in the exhaust gas of diesel engines with the aid of the oxygen contained in sizeable amounts in the diesel exhaust gas, into the non-harmful compounds $CO_2$ and water vapour. Besides carbon monoxide CO and the hydrocarbons CH, the exhaust gas of diesel engines also contains nitrogen oxides $NO_x$ and particles, which result from the incomplete combustion of diesel fuel and lubricant oil in the cylinder at temperatures which are too low and predominantly exist as such residues and which sometimes organic aggregates.

Utility vehicles, for example town buses, garbage trucks, construction and agricultural machinery, are often used in a fundamentally different driving routine from diesel cars. This results in a different exhaust gas profile with much lower exhaust gas temperatures and different exhaust gas compositions. For instance, in comparison with diesel car exhaust gases, the nitrogen oxide content is much lower but the proportion of particle emissions is sometimes significantly increased. Like the exhaust gas of diesel cars, the exhaust gas of utility vehicles furthermore contains traces of sulfur oxides $SO_x$ which result from the combustion of organyls containing sulfur in the diesel fuel. Sulfur oxides act as a catalyst poison, since they are chemisorbed in the active platinum centres and therefore block them for the desired catalytic conversions. In a diesel car, such poisons are periodically removed by running rich and increasing the exhaust gas temperatures to more than 400° C., and thermal desorption resulting from this. In a similar method, in a diesel car, active regeneration of the particle filter is also sometimes carried out, with the soot particles deposited in the filter being catalytically combusted with the oxygen contained in the exhaust gas. Even though this method is also used for other versions, it is applicable particularly when the particle filter is a wall flow particle filter.

In many utility vehicle applications, active thermal desulphation and active particle filter regeneration are ruled out because the exhaust gas temperatures are too low. Owing to the typical driving profile of utility vehicles, they usually cannot be applied without additional heating measures, which leads to an unacceptable increase in the fuel consumption. Exhaust gas purification systems for utility vehicles must therefore be equipped with sulfur poisoning-resistant exhaust gas purification units, which effectively remove CO, HC and particle emissions without requiring active particle filter regeneration or special desulphation measures in order to maintain functionality.

A combination of an oxidation catalyst and a particle filter according to EP-B-0 341 832 is suitable for this in principle, so long as an open particle filter substrate is used. The particle filter regeneration is then carried out in situ by reacting the soot particles deposited in the filter fabric with $NO_2$, which is produced by means of the upstream oxidation catalyst.

Oxidation catalysts which contain platinum supported on aluminium oxide are typically used. EP-A-1 147 801 furthermore describes the suitability of an aluminium oxide stabilized with about 5 wt % of silicon dioxide as a support material for platinum in an oxidation catalyst which produces $NO_2$.

Oxidation catalysts according to the prior art, which contain homogeneously distributed platinum on one or more support oxides, for example aluminium oxide, aluminium-silicon mixed oxide, cerium oxide or zeolite, have good oxidation performances for HC, CO and NO, and are not uncommonly distinguished by outstanding thermal ageing stabilities. However, they are susceptible to poisoning by sulfur oxides so that thermal desulphation is indispensable for their long-term use. For this reason, they cannot be used with satisfactory results in utility vehicles with the described exhaust gas profile.

It is therefore an object of the invention to provide an oxidation catalyst for utility vehicles run with diesel engines and having particle filters, which is distinguished by high NO oxidation rates even with low exhaust gas temperatures, by good long-term stability and by excellent poisoning resistance against sulfur compounds.

There is a conflict of interests between the capacity for oxidizing NO into $NO_2$ and the poisoning resistance against sulfur oxides, the reason for which resides in the acidic nature of ($NO_x$) and sulfur oxides ($SO_x$). Catalysts which exhibit good NO conversion rates usually contain slightly alkaline support oxides, on which sulfur oxides are also chemisorbed well. Consequently, for example, platinum supported only on aluminium oxide and/or rare earth-stabilized aluminium oxide exhibits a high affinity for $SO_x$ and therefore a high susceptibility to poisoning. Catalysts in which platinum is distributed homogeneously on a slightly acidic support oxide, for example on silicon dioxide or aluminium-silicon mixed oxide and, on the other hand, usually exhibit good $SO_x$ poisoning resistance but only moderate NO conversion rates under long-term ageing conditions.

The Inventors have now surprisingly found that defined distribution of the total amount of platinum used in the catalyst between the support oxide materials consisting of active aluminium oxide and aluminium-silicon mixed oxide leads to an advantageous resolution of the conflict of interest between the NO oxidation performance and the susceptibility to poisoning by sulfur oxides.

Here, the term "active aluminium oxide" refers to the following finely divided materials: active alumina, pyrogenic aluminium oxide, α-aluminium oxide, δ-aluminium oxide, θ-aluminium oxide and in particular γ-aluminium oxide, diaspore and boehmite. The term "active aluminium oxide", however, does not include aluminium oxides doped or stabilized with the rare earths or other oxides, or homogeneous mixed oxides or solid solutions of aluminium oxide with other oxides.

The term "aluminium-silicon mixed oxide" covers the following finely divided support oxides: aluminosilicates (tectosilicates) in which tetravalent silicon atoms in an $SiO_2$ framework structure are replaced by trivalent aluminium atoms, with the exception of zeolites; neso-, soro-, cyclo-, ino- and phyllosilicates which contain tetrahedral [$SiO_4$] units as basic structural units, with aluminium ions as countercations; aluminium silicates in the sense of aluminium oxide doped or stabilized with silicon dioxide which may contain octahedral [$AlO_6$] units besides tetrahedral [$SiO_4$] units and possibly [$AlO_4$] units as basic structural units; homogeneous mixed oxides and solid solutions of aluminium oxide and silicon dioxide; mixtures of the aforementioned compounds.

With the aid of this discovery, the object of the invention can be achieved by an oxidation catalyst containing a substrate and a catalytically active coating of platinum, active aluminium oxide and aluminium-silicon mixed oxide, which is characterized in that the aluminium oxide and aluminium-silicon mixed oxide are catalytically activated by means of platinum, from 55 to 95 wt % of the amount of platinum contained in the catalyst being present on the active aluminium oxide, and the remaining amount of platinum being supported on the aluminium-silicon mixed oxide. In the catalyst according to the invention, aluminium oxide and aluminium-silicon mixed oxide are present in a quantity ratio of from 1:1.5 to 1:4 with respect to one another.

Preferably, aluminium oxide and aluminium-silicon mixed oxide in the catalyst according to the invention are present in a quantity ratio of from more than 1:1.5 to 1:4 with respect to one another. According to discoveries by the Inventors, the nature of the platinum distribution between the two oxidic support materials predominantly influences the NO oxidation characteristic, whereas the quantity ratio of aluminium oxide to aluminium-silicon mixed oxide predominantly has an influence on the poisoning resistance against sulfur compounds. This can be utilized in order to adapt the composition of the oxidation catalyst optimally within the range limits essential to the invention. Thus, in an oxidation catalyst according to the invention for an application in which, for example, as much $NO_2$ as possible must be made available with a view to a diesel particle filter to be regenerated passively, preferably from 60 to 80 wt % of the amount of platinum contained in the catalyst is present on the active aluminium oxide, particularly preferably from 70 to 75 wt %. If the exhaust gas to be purified furthermore has high $SO_x$ contents, so that a particularly high poisoning resistance is required, then the ratio of aluminium oxide to aluminium-silicon mixed oxide preferably lies in the range of from 1:2 to 1:4. If—for example with guaranteed use of good fuel qualities—low $SO_x$ contents are expected in the exhaust gas, then, in order to reinforce the NO oxidation characteristic, quantity ratios of aluminium to aluminium-silicon mixed oxide of from more than 1:1.5 to 1:2.5 are preferred, and quantity ratios of from more than 1:1.5 to 1:2 are particularly preferred.

In the preferred embodiments of the catalyst according to the invention, the local concentration of platinum on aluminium oxide is at least twice as high as the local concentration of platinum on the aluminium-silicon mixed oxide. Preferably, the platinum concentration on mixed oxide, based on the total weight of the platinum applied thereon and aluminium oxide, is from twice to six times as high as the concentration of the platinum applied on aluminium-silicon mixed oxide, based on the total weight of itself and the aluminium-silicon mixed oxide.

The content of silicon dioxide $SiO_2$ in the aluminium-silicon mixed oxide also has an influence on the poisoning resistance of the oxidation catalyst according to the invention. It is preferable to use aluminium-silicon mixed oxides with a large surface area which contain from 5 to 40 wt % of $SiO_2$, based on the total weight of the aluminium-silicon mixed oxide, and have a specific surface area of more than 60 m$^2$/g (BET). Aluminium-silicon mixed oxides having from 5 to 25 wt % of $SiO_2$, based on the total weight of the aluminium-silicon mixed oxide, are preferred. In configurations of the catalyst in which particular attention is paid to the $NO_2$ formation characteristic, it is more particularly preferable to use aluminium-silicon mixed oxides having from 5 to 10 wt % of $SiO_2$, based on the total weight of the aluminium-silicon mixed oxide, and a specific surface area of more than from 150 to 220 m$^2$/g.

In the catalyst according to the invention, in order to obtain properties which achieve the object, no additional oxidic support materials are necessary besides aluminium oxide and aluminium-silicon mixed oxide. In particular, additional basic oxides are not desirable in the catalyst according to the invention, since they reduce the poisoning resistance against sulfur. Preferred configurations of the oxidation catalyst are free of rare earth metal oxides, in particular free of cerium oxide, lanthanum oxide, praseodymium oxide and neodymium oxide. Furthermore, preferred configurations of the catalyst contain no zeolite compounds and no zeolite-like materials having a lower channel width of more than 4 Ångstroms (Å), since such materials take up hydrocarbons and therefore, particularly at temperatures below 200° C., can undesirably reduce the $NO_2$ formation rate by redox reactions between these incorporated hydrocarbons and NO or $NO_2$.

The platinum content of the oxidation catalyst according to the invention preferably lies between 0.07 and 7 grams per liter [g/l], based on the volume of the catalyst substrate. The platinum content preferably lies between 0.15 and 1.5 g/l, particularly preferably between 0.17 and 0.7 g/l, based on the volume of the catalyst substrate. Other precious metals, in particular palladium and rhodium, can sometimes have a detrimental effect on the NO oxidation behaviour and/or the poisoning resistance of the catalyst. Iridium, ruthenium and gold can also disadvantageously influence the performance properties of the catalyst. Furthermore, the additional use of palladium and/or rhodium would entail undesired extra costs. The catalyst according to the invention in its preferred embodiment therefore contains no other precious metal besides platinum, and in particular not palladium and rhodium. It preferably also contains no precious metal selected from the group consisting of iridium, ruthenium and gold.

Besides the conventional methods described in the prior art, platinum can also be introduced into the catalyst by impregnation, by sorption, by precipitation and by "incipient wetness" methods known in the literature. Preferably, platinum is introduced in the form of a suitable water-soluble precursor compound into a coating suspension containing aluminium oxide and/or aluminium-silicon mixed oxide, and fixed on the support oxides in a defined way by sorption and/or precipitation. The coating suspension prepared in this way, in which platinum exists pre-fixed on aluminium oxide and aluminium-silicon mixed oxide in the quantity ratios according to the invention, is ground and applied by conventional immersion, suction and pumping methods onto a ceramic or metallic honeycomb body or, if advantageous, onto a metallic or ceramic filter body. In order to finish the catalyst according to the invention, the coated substrate obtained in this way is calcined, and optionally thermally reduced in an atmosphere which contains forming gas.

The resulting catalyst is suitable for the treatment of diesel exhaust gases, the treatment of the exhaust gas being carried out by passing the exhaust gas over the oxidation catalyst according to the invention. In particular, the catalyst according to the invention is suitable for the treatment of diesel exhaust gases when the temperature of the exhaust gas at the inlet of the oxidation catalyst is always below 500° C., as is not untypical for utility vehicles such as town buses, garbage trucks and construction and agricultural machinery.

To this end, the catalyst according to the invention is arranged upstream of a particle filter in an exhaust gas purification system for vehicles with diesel engines, the particle filter preferably being selected from the group of metallic and ceramic through-flow filter substrates, sintered metal filter bodies, ceramic or metallic foam structures and ceramic and metallic knitted and woven structures.

As an alternative, the catalyst according to the invention may be arranged upstream of an SCR catalyst in an exhaust gas purification system for vehicles with diesel engines. With the aid of this SCR catalyst, if so required, the reduction of the nitrogen oxides to nitrogen ("denox" of the exhaust gas) is carried out by selective catalytic reduction (SCR) with the aid of a reducing agent dosed into the exhaust gas system from an external source. Ammonia or a compound which releases ammonia, for example urea or ammonium carbonate, is preferably used as the reducing agent. The ammonia, optionally produced in situ from the precursor compound, reacts on the SCR catalyst with the nitrogen oxides from the exhaust gas in a comproportionation reaction to form nitrogen and water. The denox rates by means of the SCR catalyst with exhaust gas temperatures below 250° C., as to be expected in the lower bottom range of utility vehicle applications, are always particularly good when an $NO_2/NO_x$ ratio of from 0.3 to 0.7, preferably from 0.4 to 0.6, is set up by means of an oxidation catalyst arranged upstream of the SCR catalyst. By adapting the platinum content, the platinum distribution between aluminium oxide and aluminium-silicon mixed oxide and the quantity ratio aluminium oxide:aluminium-silicon mixed oxide in the scope of the limits specified in this document, the oxidation catalyst according to the invention can also be adapted outstandingly for this application.

The invention will be described in more detail below with the aid of a few examples and the following figures:

FIG. 1: conversion of NO to $NO_2$ on a catalyst K1 according to the invention and on a catalyst VK1 according to the prior art after synthetic ageing in exhaust gas containing $SO_2$ FIG. 2: conversion of NO to $NO_2$ on a catalyst according to the invention in the freshly produced state (K1") and after synthetic ageing in exhaust gas containing $SO_2$ (K1)

FIG. 3: conversion of NO to $NO_2$ on a catalyst K1' according to the invention and on a catalyst VK1' according to the prior art after synthetic ageing in a hydrothermal atmosphere FIG. 4: conversion of NO to $NO_2$ on a catalyst K2 according to the invention having an aluminium oxide:aluminium-silicon mixed oxide of 1:2 and a comparison catalyst VK2 having an aluminium oxide:aluminium-silicon mixed oxide of 2.5:1, in each case after synthetic ageing in exhaust gas containing $SO_2$

EXAMPLE 1

A catalyst according to the invention was produced with a quantity ratio aluminium oxide:aluminium-silicon mixed oxide of 1:2. To this end, the aluminium oxide was first suspended in water. Then, half of the amount of platinum to be introduced into the catalyst was added by injecting a conventional water-soluble platinum precursor compound to the suspension. After addition of the aluminium-silicon mixed oxide (specific surface area: ~212 m²/g (BET); 10 wt % $SiO_2$) to the suspension, the remaining amount of platinum was injected.

The coating suspension was applied by an immersion method according to the prior art onto a cordierite honeycomb body having 62 cells per cm² and a wall thickness of 0.17 mm. The coated honeycomb body was dried and calcined for 4 hours at 350° C.

The finished catalyst produced in this way contained 0.883 g/l of platinum, based on the volume of the honeycomb body. For the studies of catalytic activity and ageing resistance, three cylindrical bore cores with a diameter of 25.4 mm and a length of 76.2 mm were taken from it, which are referred to below by the references K1, K1' and K1".

COMPARATIVE EXAMPLE 1

For comparative studies, a commercially available diesel oxidation catalyst with the same platinum content (0.883 g/l of platinum, based on the volume of the honeycomb body) was used, in which the total amount of platinum is supported on an aluminium-silicon mixed oxide having an $SiO_2$ content of 5 wt %, and which furthermore contains zeolite compounds. This commercial diesel oxidation catalyst was also in the form of a coated cordierite honeycomb body having 62 cells per cm² and a wall thickness of 0.17 mm.

For the studies of catalytic activity and ageing resistance, two cylindrical bore cores with a diameter of 25.4 mm and a length of 76.2 mm were taken from this comparison catalyst, which are referred to below by the references VK1, VK1'.

EXAMPLE 2

A second catalyst according to the invention was produced, which differed from the catalyst of Example 1 merely in that it contained only 0.706 g/l of platinum, based on the volume of the honeycomb body.

A cylindrical bore core with a diameter of 25.4 mm and a length of 76.2 mm, which is referred to below by the reference K2, was also taken from this catalyst.

COMPARATIVE EXAMPLE 2

According to the procedure described in Examples 1 and 2, a further comparison catalyst was produced. It contained 0.706 g/l of platinum and had a quantity ratio aluminium oxide:aluminium-silicon mixed oxide of 2.5:1, i.e. not according to the invention.

A cylindrical bore core with a diameter of 25.4 mm and a length of 76.2 mm, which is referred to below by the reference VK2, was also taken from this catalyst.

Ageing:

Before studying the NO oxidation properties of the bore cores, they—with the exception of the bore core K1", which was measured in the freshly produced state—were thermally pretreated under special conditions and thereby subjected to deliberate ageing under synthetic conditions.

The bore cores K1, VK1, K2 and VK2 were treated for 48 hours at 350° C. in an atmosphere consisting of 10 vol % $CO_2$, 10 vol % $O_2$, 10 vol % $H_2O$, 85 vppm $SO_2$ and 270 vppm NO in nitrogen (throughput flow: 15,000 h$^{-1}$). A normal activity loss in combustion exhaust gas containing $SO_2$ was thereby replicated.

The bore cores K1' and VK1' were treated for a duration of 16 hours at 700° C. in an atmosphere containing 10 vol % $H_2O$ and 10 vol % $O_2$ in nitrogen. The activity loss of a catalyst during long-term use in a hydrothermal atmosphere was thereby replicated.

Testing the NO Oxidation Capacity in Various Ageing States:

All the bore cores were studied for their catalytic activity in the NO oxidation reaction in a laboratory model gas system, the following test conditions having been set up:

| Test gas composition | |
|---|---|
| CO [vppm]: | 350 |
| $H_2$ [vppm]: | 116 |

| -continued | |
|---|---|
| HC as C1 [vppm]: | 270 |
| NO [vppm]: | 270 |
| O₂ [vol %]: | 6 |
| H₂O [vol %]: | 10 |
| CO₂ [vol %]: | 10.7 |
| Test conditions | |
| Space velocity [h⁻¹]: | 50,000 |
| Excess air factor λ: | 1.377 |
| T ramp | 75-500° C.; 15K/min |

Figure 1:
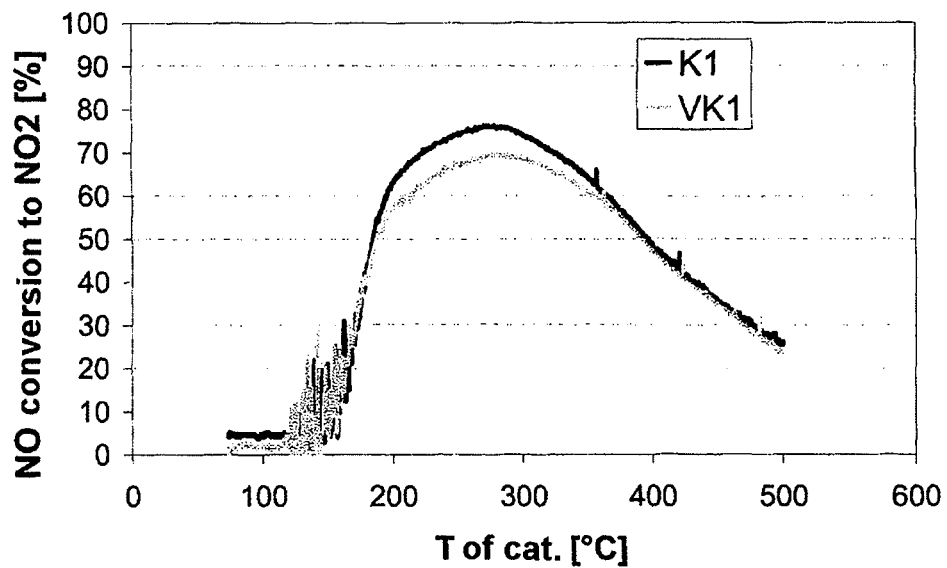
FIG. 1 shows the NO conversion into $NO_2$ of the catalyst K1 according to the invention of Example 1 and the comparison catalyst VK1 according to the prior art of Comparative Example 1 after synthetic ageing in an exhaust gas containing $SO_2$. Between 200 and 400° C., the catalyst according to the invention exhibits much better NO oxidation rates than the catalyst according to the prior art.
Figure 2:
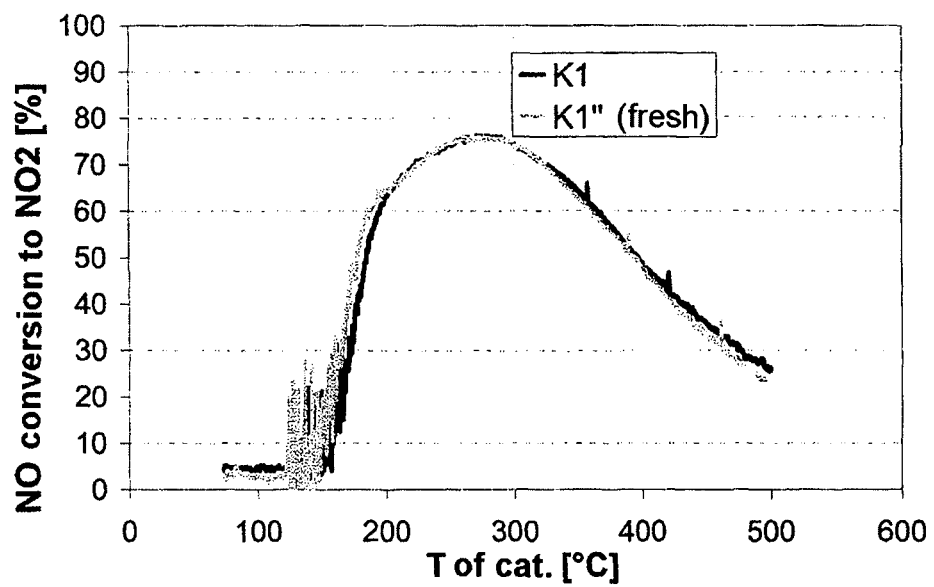
FIG. 2 shows a comparison of the NO conversion rates of the catalyst according to the invention of Example 1 in the freshly produced state (K1") and after synthetic ageing in an exhaust gas containing $SO_2$ (K1). It can be seen clearly that the exposure to exhaust gas containing $SO_2$ has virtually no detrimental effects on the NO oxidation activity of the catalyst according to the invention.
Figure 3:
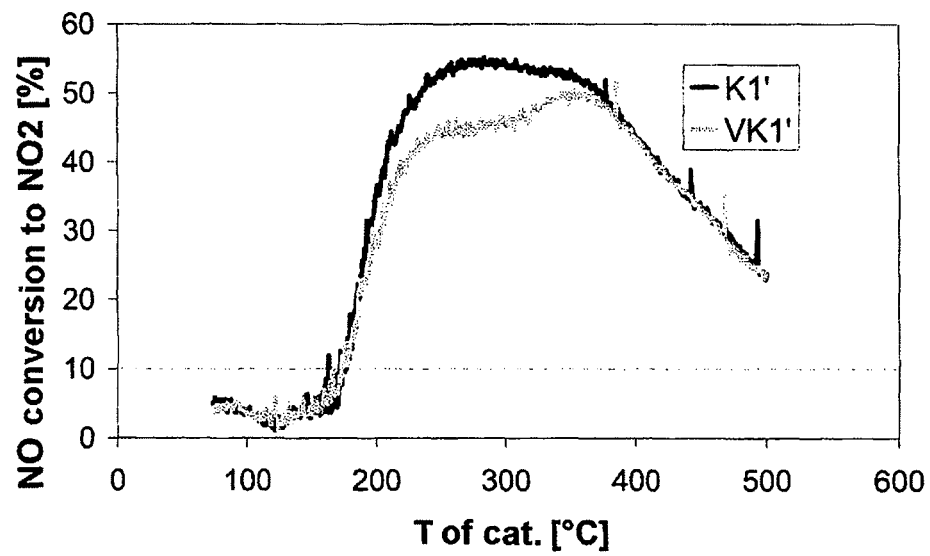

In order to test the long-term stability of the catalyst according to the invention of Example 1, the NO activities of K1' and the comparison catalyst VK1' of Comparative Example 1 were also studied after synthetic ageing under hydrothermal conditions. FIG. 3 shows the result. It can be seen clearly that the catalyst according to the invention also exhibits improved long-term stability of the NO oxidation activity in the temperature range of between 200 and 400° C.

Figure 4:
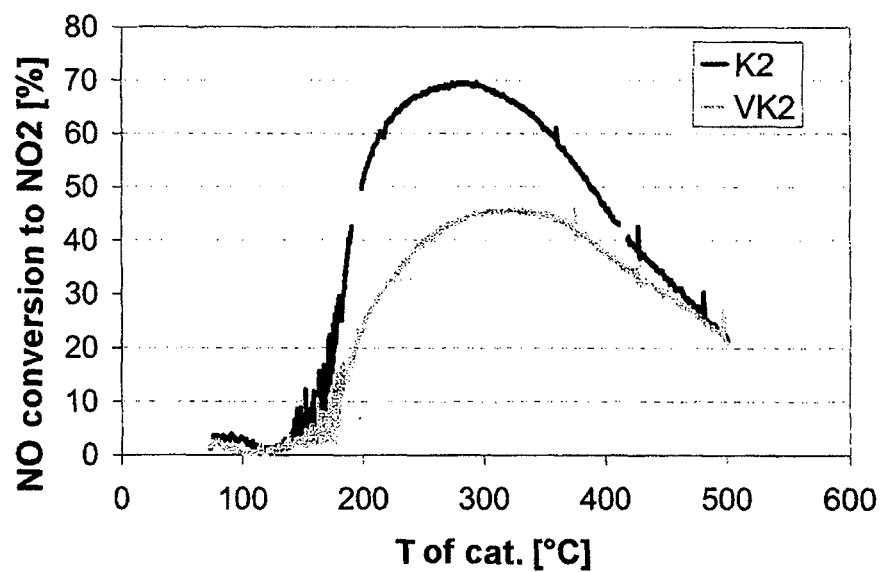

FIG. 4 shows how great the influence of the quantity ratio of the support oxides is on the effective resolution of the conflict of interest between the NO oxidation capacity and $SO_2$ poisoning resistance. The NO oxidation activity, after synthetic ageing in an exhaust gas containing $SO_2$, of a catalyst K2 according to the invention of Example 2 with a quantity ratio aluminium oxide:aluminium-silicon mixed oxide of 1:2 was compared with that of the comparison catalyst VK2 of Comparative Example 2 with a quantity ratio aluminium oxide:aluminium-silicon mixed oxide of 2.5:1. It can be seen clearly that the excess of aluminium oxide leads to dramatic losses of the NO oxidation capacity after loading the comparison catalyst with an aluminium oxide excess, whereas the catalyst according to the invention withstands the exposure to an atmosphere containing $SO_2$ almost undamaged in relation to its NO oxidation capacity.

The invention claimed is:

1. An oxidation catalyst containing a substrate and a catalytically active coating comprising platinum, active aluminium oxide and aluminium-silicon mixed oxide, wherein
the aluminium oxide and the aluminium-silicon mixed oxide are catalytically activated by means of platinum,
from 55 to 95 wt % of the amount of platinum contained in the catalyst is present on the active aluminium oxide, and the remaining amount of platinum is supported on the aluminium-silicon mixed oxide, and
a weight ratio of aluminium oxide to aluminium-silicon mixed oxide is in a range from 1:1.5 to 1:4.

2. The oxidation catalyst according to claim 1, wherein the aluminium-silicon mixed oxide contains from 5 to 40 wt % of $SiO_2$, based on the total weight of the aluminium-silicon mixed oxide.

3. The oxidation catalyst according to claim 2, wherein the aluminium-silicon mixed oxide has a specific surface area of more than 60 m²/g (BET).

4. The oxidation catalyst according to claim 1, wherein the platinum content of the catalyst is between 0.07 and 7 grams per liter, based on the volume of the catalyst substrate.

5. The oxidation catalyst according to claim 4, wherein the catalyst contains no other precious metal besides platinum.

6. The oxidation catalyst according to claim 4, wherein the catalyst contains no precious metal selected from the group consisting of iridium, ruthenium and gold.

7. The oxidation catalyst according to claim 4, wherein the catalyst is free of rare earth metal oxides.

8. The oxidation catalyst according to claim 4, wherein the catalyst is free of zeolite compounds and zeolite-like materials having a lower channel width of more than 4 Ångstroms.

9. An exhaust gas purification system for vehicles with diesel engines, wherein an oxidation catalyst containing a substrate and a catalytically active coating comprising platinum, active aluminium oxide and aluminium-silicon mixed oxide is arranged upstream of a particle filter, wherein
in the oxidation catalyst the aluminium oxide and the aluminium-silicon mixed oxide are catalytically activated by means of platinum,
from 55 to 95 wt % of the amount of platinum contained in the catalyst is present on the active aluminium oxide, and the remaining amount of platinum is supported on the aluminium-silicon mixed oxide, and
a weight ratio of aluminium oxide to aluminium-silicon mixed oxide is in a range from 1:1.5 to 1:4.

10. The exhaust gas purification system according to claim 9, wherein
the particle filter is selected from the group of metallic and ceramic through-flow filter substrates, sintered metal filter bodies, ceramic or metallic foam structures and ceramic and metallic knitted and woven structures.

11. An exhaust gas purification system for vehicles with diesel engines, wherein an oxidation catalyst containing a substrate and a catalytically active coating comprising platinum, active aluminium oxide and aluminium-silicon mixed oxide is arranged upstream of an SCR catalyst, wherein
the aluminium oxide and the aluminium-silicon mixed oxide are catalytically activated by means of platinum,
from 55 to 95 wt % of the amount of platinum contained in the catalyst is present on the active aluminium oxide, and the remaining amount of platinum is supported on the aluminium-silicon mixed oxide, and
a weight ratio of aluminium oxide to aluminium-silicon mixed oxide is in a range from 1:1.5 to 1:4.

12. A method for treating diesel exhaust gases, wherein the exhaust gas is passed through an oxidation catalyst according to claim 1.

13. A method for treating diesel exhaust gases according to claim 12, wherein
the temperature of the exhaust gas at the inlet of the oxidation catalyst is always lower than 500° C.

14. The oxidation catalyst according to claim 4, wherein the catalyst is free of palladium and rhodium.

15. The oxidation catalyst according to claim 4, wherein the catalyst is free of cerium oxide, lanthanum oxide, praseodymium oxide and neodymium oxide.

16. The oxidation catalyst according to claim 1, wherein the aluminium-silicon mixed oxide is not a zeolite.

17. The oxidation catalyst according to claim 1, wherein
the oxidation catalyst contains no zeolite-structured materials.

18. The exhaust gas purification system according to claim 9, wherein
the aluminium-silicon mixed oxide is not a zeolite.

19. The exhaust gas purification system according to claim 9, wherein
the oxidation catalyst contains no zeolite compounds.

20. The exhaust gas purification system according to claim 11, wherein
the aluminium-silicon mixed oxide is not a zeolite.

21. The exhaust gas purification system according to claim 11, wherein
the oxidation catalyst contains no zeolite compounds.

* * * * *